Jan. 5, 1954 J. M. STRACHAN 2,664,790
WORK LOADING MECHANISM

Filed Dec. 17, 1949 3 Sheets-Sheet 1

INVENTOR
John M. Strachan
By Carlson, Pilgrim, Husband + Wolfe
ATTORNEYS

Jan. 5, 1954     J. M. STRACHAN     2,664,790
WORK LOADING MECHANISM
Filed Dec. 17, 1949     3 Sheets-Sheet 2
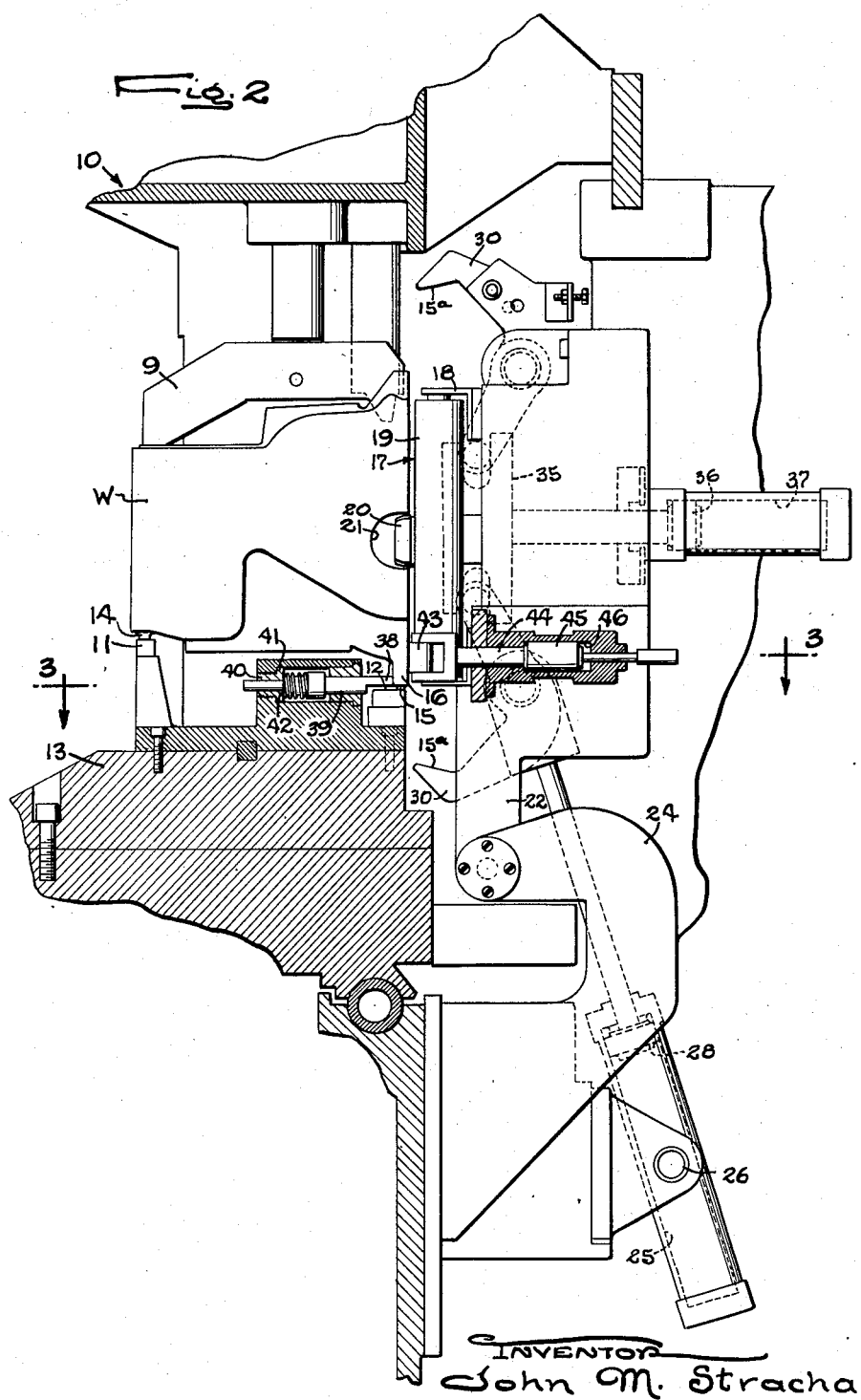
INVENTOR
John M. Strachan
By Carlson, Pitzner, Hubbard & Wolfe
ATTORNEYS Jan. 5, 1954　　　　J. M. STRACHAN　　　2,664,790
WORK LOADING MECHANISM
Filed Dec. 17, 1949　　　　　　　　　　3 Sheets-Sheet 3
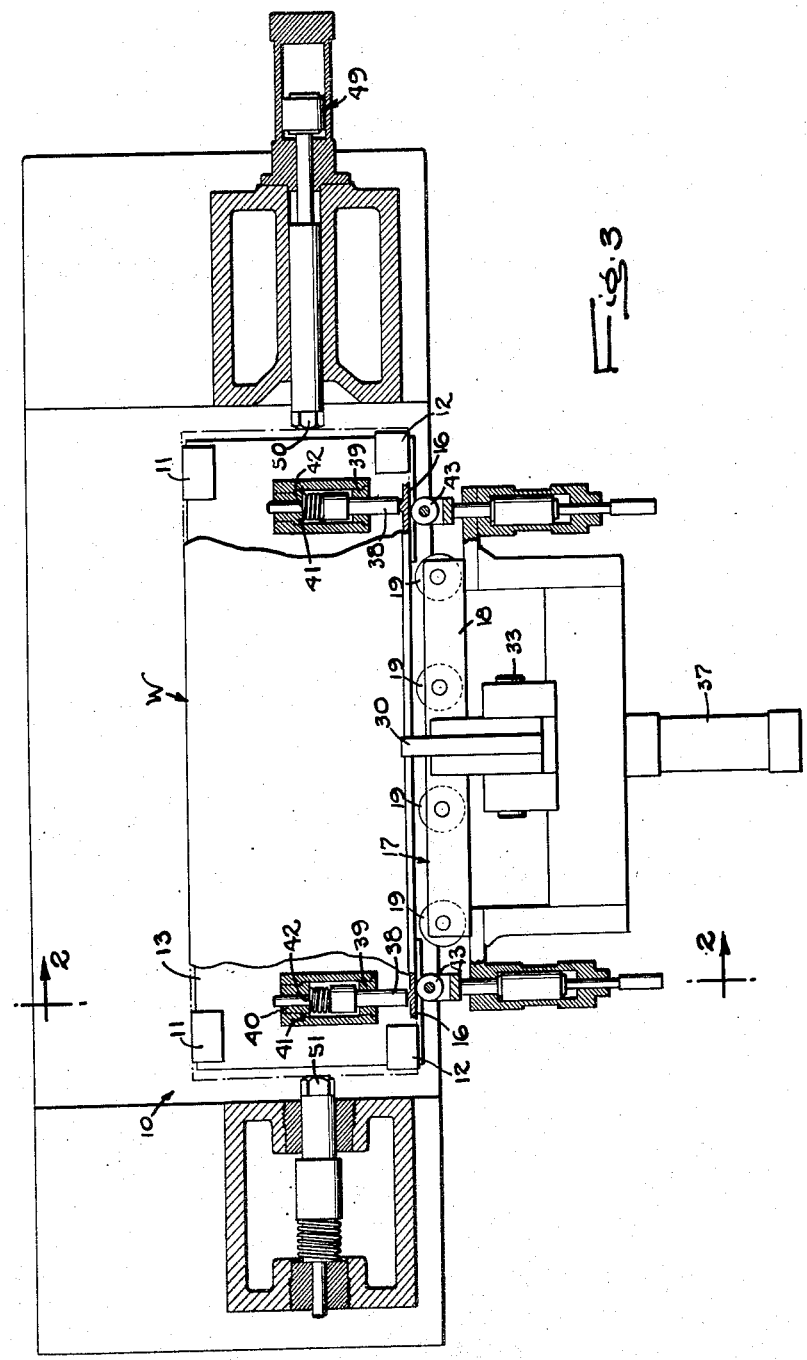
INVENTOR
John M. Strachan
By Cullen, Pilgner, Hufgard & Wolfe
ATTORNEYS Patented Jan. 5, 1954

2,664,790

UNITED STATES PATENT OFFICE 2,664,790

WORK LOADING MECHANISM

John M. Strachan, Rockford, Ill., assignor to The Ingersoll Milling Machine Company, Rockford, Ill., a corporation of Illinois Application December 17, 1949, Serial No. 133,630

4 Claims. (Cl. 90—21)

This invention relates to a mechanism for moving a workpiece into a fixture in which the piece is held while being operated on by a cutter or the like.

One object is to provide a power actuated work loader for depositing a workpiece in a fixture and incorporating a novel mechanism for effecting accurate positioning of the workpiece relative to the fixture.

A more detailed object is to incorporate on the movable part of the loader a power actuated pusher element which, when energized after the workpiece has been deposited in the fixture, operates to push the workpiece further into the fixture and against a stop by which the final location of the piece is determined.

Another object is to provide an auxiliary work positioning mechanism in a loader of the type in which the work is delivered to the fixture along an arcuate path.

Other objects and advantages of the invention will become apparent from the following detailed description taken in connection with the accompanying drawings, in which Figure 1 is a fragmentary vertical sectional view of a work loading mechanism embodying the novel features of the present invention.

Fig. 2 is a fragmentary vertical sectional view taken substantially along the line 2—2 of Fig. 3.

Fig. 3 is a fragmentary sectional view taken along the line 3—3 of Fig. 2.

Figure 1:
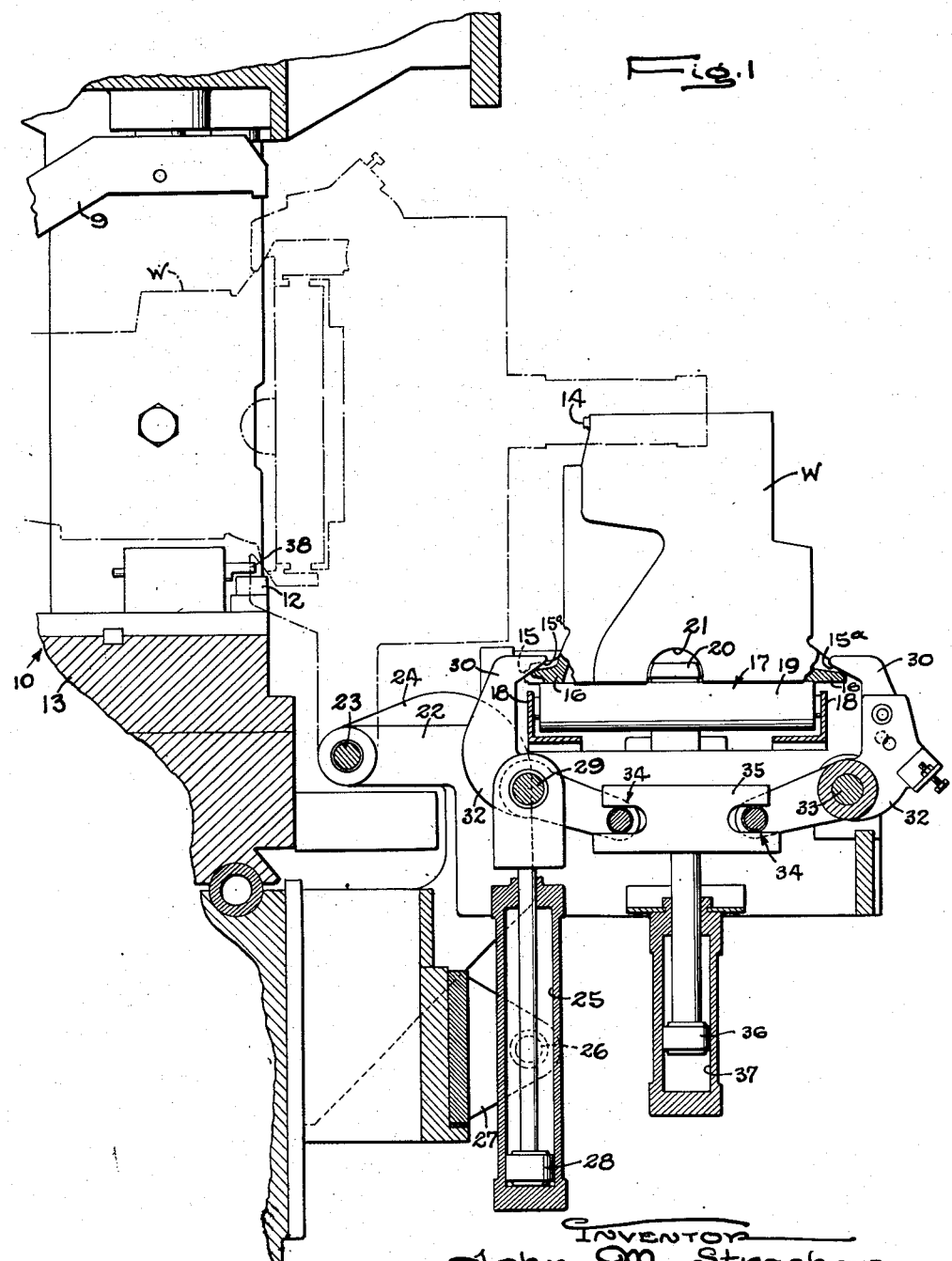

The invention is shown in the drawings incorporated in a mechanism for loading a workpiece W, which may for example be an engine block, into a fixture 10 in which the piece, while being machined, is clamped against the tops of four buttons 11 and 12 upstanding from the fixture base 13. The supporting buttons are positioned for engagement with bosses 14 projecting from one side of the workpiece near the top and two bosses 15 at opposite ends of a flange 16 projecting outwardly along the bottom of the piece. The clamping may be effected by a plurality of power actuated shoes 9 pressed downwardly against the top of the workpiece after positioning of the latter in the fixture as shown in Fig. 2.

Loading of the workpiece into the fixture 10 is effected by a movement of the piece from the upright position shown in Fig. 1 along an arcuate path during which the piece is turned through a quarter revolution and delivered into the fixture immediately above the supporting surfaces 11 and 12 as shown in phantom in Fig. 1. The loading device is power actuated and comprises a platform 17 in the form of a generally rectangular block having upstanding side rails 18 rotatably supporting opposite ends of a series of rollers 19 which are spaced along the platform longitudinally of the work table. A guide rail 20 is supported by end brackets above the level of the rollers 19 to enter the bottom recess 21 in the workpiece and thus center the latter on the platform.

Projecting horizontally from the inner edge of the platform are arms 22 pivoted adjacent the fixture 10 on a shaft 23 which is supported in stationary brackets 24. The shaft is located so that a workpiece centered on the platform as shown in full in Fig. 1 will, in swinging of the platform upwardly into a vertical plane as shown in phantom, move the workpiece in an arcuate path tipping the piece onto its side and transferring the piece into the open side of the fixture, the bosses 14 and 15 on the workpiece being brought into positions immediately above and close to or in contact with the supporting buttons 11 and 12 on the fixture base.

The platform is thus raised by a power actuator including herein a cylinder 25 pivoted at 26 between lugs 27 on a stationary part. The rod of a piston 28 slidable in the cylinder 25 projects upwardly and is pivotally connected to a rockshaft 29 journaled on the platform 17 along and below the inner edge thereof. The platform is raised when pressure fluid is admitted to the lower end of the cylinder 25 whose closed upper end forms a stop for arresting the swinging of the platform when the workpiece reaches the position shown in phantom in Fig. 1.

During its transfer into and out of the fixture 10, the workpiece is clamped firmly against the platform rollers by three jaws 30 projecting upwardly and around the edges of the platform and formed on the ends of bell cranks 32, two of which are fast on the rockshaft 29 and the other of which is on a rockshaft 33 extending along and disposed below the outer edge of the platform. The other arms of the bell cranks project inwardly beneath the platform and have pin and slot pivotal connections 34 at their ends with a head 35 on the upper end of the rod of a piston 36 which slides vertically in a cylinder 37 on the platform, the piston and cylinder forming a hydraulic actuator. When the head 35 is moved upwardly by the admission of pressure fluid below the piston 36, the bell cranks are rocked to move the jaws 30 outwardly thereby permitting a workpiece to be slid endwise onto or off from the platform then disposed in horizontal position. Lowering of the plunger to the position shown in Fig. 1 swings the jaws inwardly and toward each other to bring the upwardly and inwardly inclined under surfaces of the jaw ends into overlying relation and engagement with the bottom flanges 16 of the workpiece.

With the piece thus centered accurately on the platform and then clamped rigidly against the rollers 19, pressure fluid is admitted to the lower end of the cylinder 25 whereupon the piston 28 is moved upwardly swinging the platform 17 upwardly and laterally into the position shown in phantom in Fig. 1. The workpiece is thus moved into the fixture and comes to rest with the bosses 14 and 15 disposed immediately adjacent and slightly above the buttons 11 and 12. Then, when the clamps 30 are retracted by releasing the pressure behind the piston 36, the workpiece is lowered onto and becomes supported by the buttons 11 and 12.

At this time, the flange 16 on the workpiece will be disposed close to and facing toward two stops in the form of rods 38 mounted in the fixture base 13 at opposite ends of the work flange. Each rod slides endwise and horizontally in bearings 39 and 40, the latter of which is on a plug 41 threaded into the fixture base so as to be adjustable axially to vary the position of the inner plug end which is engageable with a shoulder 42 on the rod to limit the extent of inward movement of the stop and thus determine the position to which the workpiece may be shifted after being deposited in the fixture. The stops are normally urged outwardly by springs.

In accordance with the present invention means is incorporated in the movable loading device described above for shifting the workpiece after deposit thereof in the fixture and locating the pieces against the stops 38. Herein, this is accomplished by two pushers in the form of rolls 43 at opposite ends of the platform 17 normally disposed below the supporting surface of the rollers 19 and mounted on the platform for projection outwardly beyond the rollers to push the deposited workpiece away from the platform. The pushers are on the ends of rods 44 slidable in bearings on the platform 17 and carrying pistons 45 which cooperate with cylinders 46 to form power actuators. The extent of movement of the pushers is determined by the length of the cylinders.

When pressure fluid is admitted against the head end of the pistons 45 after the workpiece has been transferred into the fixture and the clamping jaws released as shown in Fig. 2, the pusher elements 43 will be projected forwardly and outwardly beyond the rollers 19. The workpiece then resting on the buttons 11 and 12 will be slid transversely and further into the fixture until the stop pins 38 come against the plug 41. The amount of this shift is always less than the overall height of the active inclined surfaces 15a of the jaws 30. Both ends of the workpiece are thus positioned accurately in a direction transverse of the fixture. Longitudinal positioning of the workpiece may be effected by energizing a hydraulic actuator 49 to project a plunger 50 against one end of the workpiece and thus shift the workpiece until the other end thereof comes against a stop 51 with the workpiece thus located in two transverse directions as shown in phantom in Fig. 3. The shoes 9 may be lowered to clamp the workpiece in its final location. By returning the platform 17 to the horizontal position shown in Fig. 1, the workpiece will be exposed for machining or the performance of other operations thereon.

After the workpiece has been operated on and the clamps released, the power actuated transfer device may again be used to remove the piece from the fixture. This is accomplished by swinging the platform upwardly to the position shown in Fig. 2 with the jaws 30 and the pushers 43 retracted. Then, when pressure is applied to the rod end of the piston 36, the jaws will swing in and around the workpiece flanges 16, their inclined edges acting as cams to draw the workpiece laterally and against the rollers 19. The piece thus fastened to the platform is removed as the platform is again swung outwardly and downwardly into horizontal position.

The incorporation of the pusher or work positioning elements 43 and their power actuators in the movable transfer device or platform 17 is advantageous for several reasons. First, the mechanism required for shifting the workpiece against the stops 38 is extremely simple and reliable in operation. Also, it is usable with workpieces of a wide variety of sizes and shapes and thus minimizes the changes required to be made in order to adapt the fixture for handling different workpieces.

I claim as my invention:

1. The combination of, a fixture having a horizontally facing opening for receiving a workpiece, upwardly facing surfaces on said fixture for supporting the workpiece deposited therein, stops rigid with said fixture and facing in the direction of said opening, a platform engageable with a workpiece and mounted to swing between a horizontal retracted position and a loading position across said opening, jaws having inner surfaces converging toward each other away from the platform and mounted thereon for movement into and out of engagement with ledges on the workpiece to clamp the latter against said platform or to release the workpiece, power actuated mechanism for moving said platform between said positions to deposit the same on said surfaces short of said stops by a distance less than the height of said jaw surfaces, a pusher normally disposed below the supporting surface of said platform and mounted thereon for movement outwardly from said surface, and power actuated means by which said pusher may be projected outwardly after the workpiece has been deposited on said surfaces whereby to move the piece against said stops.

2. The combination of, a fixture having an opening therein for receiving a workpiece, surfaces on said fixture for supporting the workpiece deposited therein, stops rigid with said fixture and facing in a direction parallel to said supporting surfaces and substantially normal to said opening, a member engageable with a workpiece, means mounted on said member for movement into and out of engagement with a workpiece to clamp the latter against the member or release the workpiece, power actuated mechanism for moving said member in an arcuate path toward and away from said opening to carry a workpiece thereon through the opening and deposit the same on said surfaces in a position short of said stops, a pusher normally disposed below the supporting surface of said member and mounted thereon for movement outwardly from said surface, and power actuated means by which said pusher may be projected outwardly from said member after the workpiece has been deposited on said surfaces and released by the clamping means whereby to move the piece against said stops, said clamping means having surfaces thereon engageable with the workpiece after the latter has been positioned against said stops.

3. The combination of, a fixture having an opening therein for receiving a workpiece, surfaces on said fixture for supporting the workpiece deposited therein, stops rigid with said fixture and facing in a direction parallel to said supporting surfaces and substantially normal to said opening, a member engageable with a workpiece, means mounted on said member for movement into and out of engagement with a workpiece to clamp the latter against the member or release the workpiece, power actuated mechanism for moving said member in an arcuate path toward and away from said opening to carry a workpiece thereon through the opening and deposit the same on said surfaces upon release of said clamping means, a pusher normally disposed below the supporting surface of said member and mounted thereon for movement outwardly from said surface, and power actuated means by which said pusher may be projected outwardly from said member after the workpiece has been deposited on said surfaces whereby to move the piece against said stops.

4. The combination of, a fixture having an upright horizontally facing locating surface, a platform adapted to receive and support a workpiece in a horizontal retracted position, means supporting said platform to swing upwardly about a horizontal axis and carry the supported workpiece from said retracted position to an upright position adjacent and spaced from said fixture surface, means on said platform for holding the workpiece thereon during upward swinging of the platform to said upright position, a pusher mounted on said platform for bodily movement therewith and movable relative to the platform to move the workpiece off from the latter and press the same against said locating surface, and power actuators selectively energizable to swing said platform and to move said pusher in and out.

JOHN M. STRACHAN.

References Cited in the file of this patent

UNITED STATES PATENTS

| Number | Name | Date |
|---|---|---|
| 1,218,044 | Beaman | Mar. 6, 1917 |
| 1,297,983 | Anderson | Mar. 25, 1919 |
| 2,326,847 | Fanning | Aug. 17, 1934 |
| 2,142,735 | Rougemont | Jan. 3, 1939 |
| 2,235,832 | Freeman | Mar. 25, 1941 |
| 2,542,986 | Bowen | Feb. 27, 1951 |
| 2,577,766 | Johnson et al. | Dec. 11, 1951 |